United States Patent
Lee et al.

(10) Patent No.: US 8,411,647 B2
(45) Date of Patent: Apr. 2, 2013

(54) RANDOM ACCESS SYSTEM FOR USING MULTI-CARRIER STRUCTURE IN MOBILE COMMUNICATION SYSTEM

(75) Inventors: Kyoung Seok Lee, Daejeon (KR); Taegyun Noh, Daejeon (KR); Jae Heung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 403 days.

(21) Appl. No.: 12/767,359

(22) Filed: Apr. 26, 2010

(65) Prior Publication Data
US 2010/0278128 A1 Nov. 4, 2010

(30) Foreign Application Priority Data

Apr. 24, 2009 (KR) .................. 10-2009-0035843
Aug. 6, 2009 (KR) .................. 10-2009-0072370
Apr. 23, 2010 (KR) .................. 10-2010-0038153

(51) Int. Cl.
H04J 3/00 (2006.01)
H04B 7/208 (2006.01)
H04W 4/00 (2009.01)

(52) U.S. Cl. .................. 370/337; 370/330; 370/344

(58) Field of Classification Search .................. 370/203, 370/208–210, 468, 447, 461–462, 445, 448, 370/337, 344, 330, 321, 329, 347, 431, 432
See application file for complete search history.

(56) References Cited

U.S. PATENT DOCUMENTS

| 7,839,829 | B2* | 11/2010 | Lee et al. | 370/336 |
| 8,077,670 | B2* | 12/2011 | Fan et al. | 370/330 |
| 2008/0305822 | A1 | 12/2008 | Li et al. | |
| 2010/0067495 | A1* | 3/2010 | Lee et al. | 370/335 |
| 2010/0098050 | A1* | 4/2010 | Yamada et al. | 370/350 |

FOREIGN PATENT DOCUMENTS

KR 1020080039177 5/2008

* cited by examiner

*Primary Examiner* — Hanh N Nguyen
(74) *Attorney, Agent, or Firm* — Nelson Mullins Riley & Scarborough LLP; EuiHoon Lee, Esq.

(57) ABSTRACT

Provided is a system of performing a random access between a base station and a terminal using a plurality of carriers. When using the plurality of carriers, an uplink carrier and a downlink carrier may be mapped to each other in 1:n or 1:1. The terminal may perform the random access based on mapping information between the uplink carrier and the downlink carrier. A random access success rate increases and thus a time used for the random access may decrease. A wireless resource may also be effectively used.

17 Claims, 8 Drawing Sheets

RANDOM ACCESS SYSTEM FOR USING MULTI-CARRIER STRUCTURE IN MOBILE COMMUNICATION SYSTEM

CROSS-REFERENCE TO RELATED APPLICATION

This application claims the benefit of Korean Patent Application No. 10-2009-0035843, filed on Apr. 24, 2009, Korean Patent Application No. 10-2009-0072370, filed on Aug. 6, 2009, and Korean Patent Application 10-2010-0038153, filed on Apr. 23, 2010, in the Korean Intellectual Property Office, the disclosure of which is incorporated herein by reference.

TECHNICAL FIELD

The present invention relates to a mobile communication system that may effectively provide a communication between a base station and a terminal using a plurality of carriers.

This work was supported by the IT R&D program of MIC/IITA. [2006-S-003-04, Development of Service Platform for Next Generation Mobile Communication]

BACKGROUND ART

A 3$^{rd}$ Generation Partnership Project (3GPP) that is a mobile communication standardization organization has developed a Long Term Evolution (LTE) system standard for development of a next generation mobile communication standard. Also, to satisfy an International Mobile Telecommunication (IMT)-Advanced requirement proposed by International Telecommunication Union (ITU)-R Recommendations, the LTE-Advanced system standard in which an LTE standard is expanded is in development.

The LTE standard may support a maximum wireless bandwidth for a mobile communication up to 20 MHz, and may employ a carrier aggregation technology in order to support a maximum bandwidth of 100 MHz. The bandwidth of 100 MHz may be divided into component carriers (CCs) each having a maximum magnitude of 20 MHz. A base station and a terminal may perform a communication by simultaneously employing a plurality of carriers.

DESCRIPTION OF THE INVENTION

Subjects to be Solved by this Invention

An aspect of the present invention is to enable a terminal to quickly perform a random access.

Another aspect of the present invention is to enable a terminal to perform a random access while minimizing a consumption of wireless resources.

Solutions to Solve the Subjects

According to an aspect of the present invention, there is provided a terminal, including: a preamble transmitter to transmit a first preamble to a base station using an uplink carrier; a receiver to receive, in response to the first preamble, information associated with a first wireless resource of the uplink carrier using a first downlink carrier selected from a plurality of downlink carriers; and a data transmitter to transmit first uplink data to the base station using the first wireless resource. The base station may receive, from a second terminal, a second preamble having the same value as the first preamble, may transmit, to the second terminal in response to the second preamble, information associated with a second wireless resource of the uplink carrier using a second downlink carrier, and may receive second uplink data from the second terminal using the second wireless resource. In this instance, the second downlink carrier may be selected from the plurality downlink carriers and is different from the first downlink carrier, and the second wireless resource may be different from the first wireless resource.

According to another aspect of the present invention, there is provided a base station, including: a preamble receiver to receive a first preamble from a first terminal using an uplink carrier, and to receive, from a second terminal, a second preamble having the same value as the first preamble using the uplink carrier; a transmitter to transmit, to the first terminal in response to the first preamble, information associated with a first wireless resource of the uplink carrier using the first downlink carrier, and to transmit, to the second terminal in response to the second preamble, information associated with a second wireless resource of the uplink carrier using a second downlink carrier, the second downlink carrier being different from the first downlink carrier and the second wireless resource being different from the first wireless resource; and a data receiver to receive first uplink data from the first terminal using the first wireless resource, and to receive second uplink data from the second terminal using the second wireless resource.

According to still another aspect of the present invention, there is provided a terminal, including: a receiver to receive, from a base station, information associated with a wireless resource of a first uplink carrier; a preamble transmitter to transmit a preamble to the base station using the wireless resource of the first uplink carrier; and a data transmitter. In response to the preamble, the receiver may receive, from the base station, information associated with a wireless resource of a second uplink carrier. The data transmitter may transmit uplink data to the base station using the wireless resource of the second uplink data.

According to yet another aspect of the present invention, there is provided a base station, including: a transmitter to transmit, to a terminal, information associated with a wireless resource of a first uplink carrier; a preamble receiver to receive a preamble from the terminal using the wireless resource of the first uplink carrier; and a data receiver. In response to the preamble, the transmitter may transmit, to the terminal, information associated with a wireless resource of a second uplink carrier. The data receiver may receive uplink data from the base station using the wireless resource of the second uplink carrier.

Effect of the Invention

According to embodiments of the present invention, a terminal may quickly perform a random access.

Also, according to embodiments of the present invention, a terminal may perform a random access while minimizing a consumption of wireless resources.

MODE FOR CARRYING OUT THE INVENTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
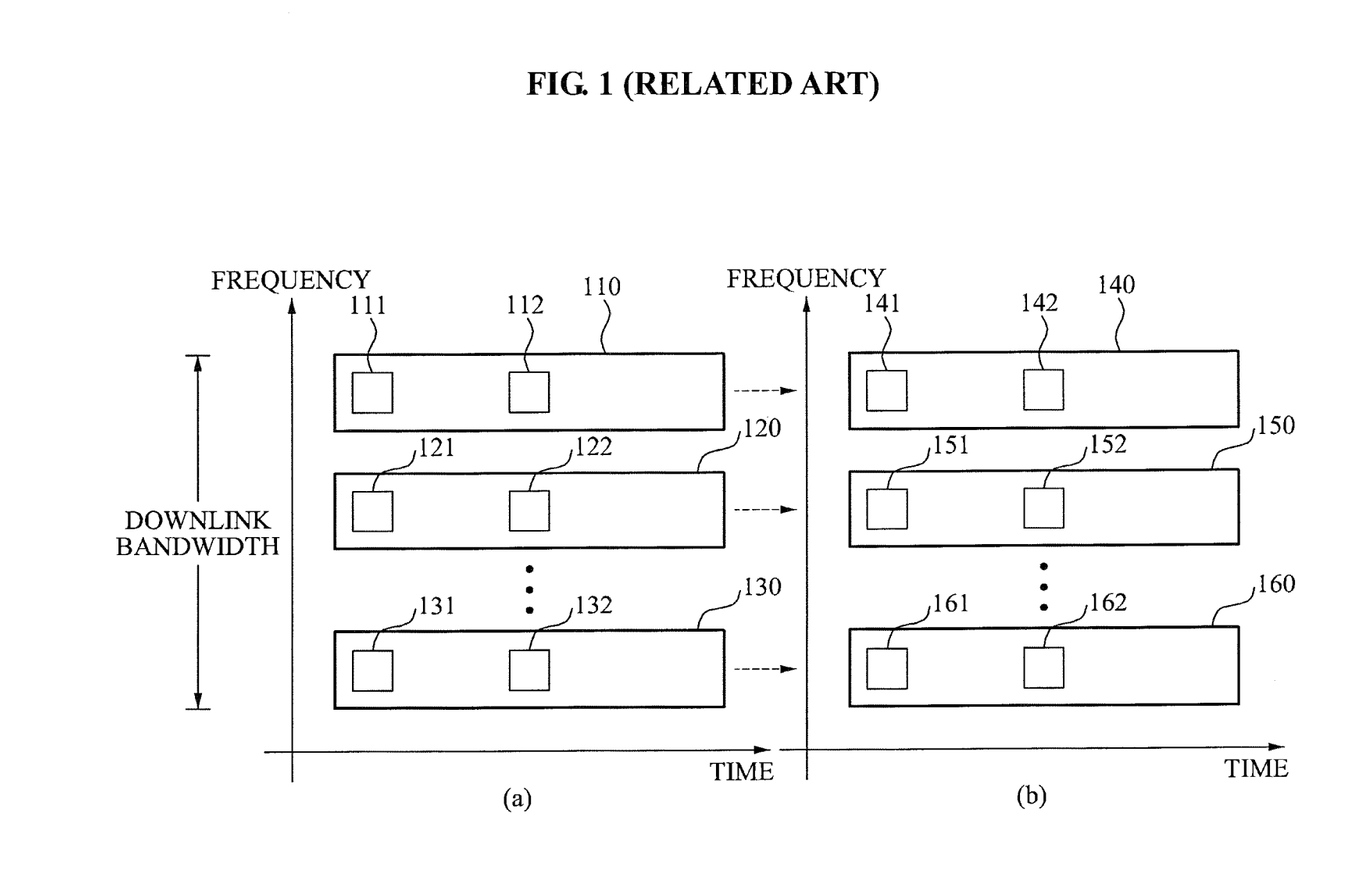
FIG. 1 is a diagram illustrating a resource allocation of a mobile communication system using a multi-carrier structure according to a related art.

FIG. 1 is a diagram illustrating a resource allocation of a mobile communication system using a multi-carrier structure according to a related art. Part (a) of FIG. 1 is a diagram illustrating a resource allocation of a downlink and part (b) of FIG. 1 is a diagram illustrating a resource allocation of an uplink. A base station using multiple carriers may periodically transmit synchronous signals and base station information 111 and 112, 121 and 122, and 131 and 132 to respective downlink carriers 110, 120, and 130, enabling a terminal to obtain base station information.

Base station information transmitted from each of the downlink carriers 110, 120, and 130 may include information associated with only a corresponding carrier, so that a terminal using only a single carrier may use the base station information. For example, when the entire bandwidth is 100 MHz, the terminal may provide a data transmission service using a carrier of 20 MHz. In this case, base station information included in each carrier may include only bandwidth information associated with each corresponding carrier.

Referring to the part (b), the base station may allocate a plurality of uplink carriers 140, 150, and 160 with respect to the uplink according to a similar scheme. The base station may allocate random access wireless resources 141 and 142, 151 and 152, and 161 and 162 to the respective uplink carriers 140, 150, and 160. The terminal may transmit a random access message to the base station using the random access wireless resources 141, 142, 151, 152, 161, and 162.

In the mobile communication system using the multi-carrier structure, carriers of a downlink and an uplink may use a mapping structure for a data transmission between the base station and the terminal. Referring to FIG. 1, the uplink carriers 140, 150, and 160 may be mapped to the downlink carriers 110, 120, and 130 in a one-to-one, that is, 1:1 correspondence. This structure may be referred to as a synchronous structure. Mapping information may be indicated in system information of a broadcasting channel transmitted using a downlink carrier and thereby be transmitted. For example, the carrier 110 of the downlink may be mapped to the carrier 140 of the uplink. In this structure, a first terminal receiving base station information including system information of a broadcasting channel using a first downlink carrier, for example, the downlink carrier 110 may perform a random access using a first uplink carrier, for example, the uplink carrier 140. A second terminal receiving base station information using a second downlink carrier, for example, the downlink carrier 120 may perform a random access using a second uplink carrier, for example, the uplink carrier 150.

Also, the uplink carriers 140, 150, and 160 may be mapped to the downlink carriers 110, 120, and 130 in a one-to-n, that is, 1:n correspondence. This structure may be referred to as an asynchronous structure. Mapping information may be indicated in system information of a broadcasting channel transmitted using a downlink carrier and thereby be transmitted. For example, the single uplink carrier 140 may be mapped to the downlink carriers 110 and 120. In this structure, both the first terminal receiving base station information using the first downlink carrier, for example, the downlink carrier 110 and the second terminal receiving base station information using the second downlink carrier, for example, the downlink carrier 120 may perform the random access using the first uplink carrier, for example, the uplink carrier 140.

Figure 2:
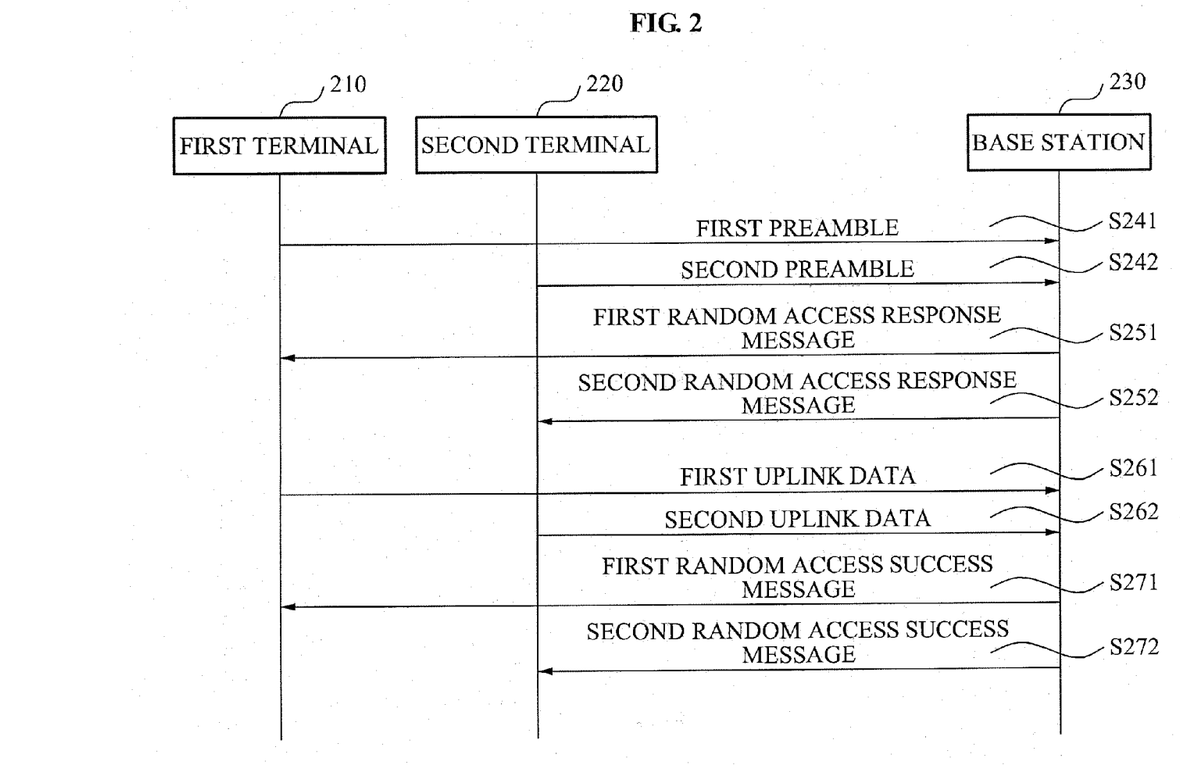
FIG. 2 is a diagram illustrating a random access procedure when an uplink and a downlink make a one-to-n correspondence according to an embodiment of the present invention.

FIG. 2 is a diagram illustrating a random access procedure when an uplink and a downlink make a one-to-n correspondence according to an embodiment of the present invention.

Here, it is assumed that a first terminal 210 receives base station information using a first downlink carrier and a second terminal 220 receives base station information using a second downlink carrier.

When the uplink and the downlink make the one-to-n correspondence, both the first terminal 210 and the second terminal 220 may perform the random access procedure using the same uplink carrier.

In operation S241, the first terminal 210 may transmit a first preamble to a base station 230 using an uplink carrier. In operation S242, the second terminal 220 may transmit a second preamble to the base station 230 using the uplink carrier. When an identifier of the first preamble has the same value as an identifier of the second preamble, and the first terminal 210 and the second terminal 220 transmit the first preamble and the second preamble using the same uplink wireless resource, the base station 230 may not identify each of the first preamble and the second preamble. Specifically, the base station 230 may determine only a single preamble is received.

When the uplink and the downlink make the one-to-n correspondence, both the first terminal 210 receiving base station information using the first downlink carrier and the second terminal 220 receiving base station information using the second downlink carrier may transmit corresponding preambles using a first uplink carrier. Accordingly, the base station 230 may be unaware that a corresponding preamble is received from a terminal having receiving base station information which downlink carrier. The base station 230 may transmit a random access response message with respect to a preamble using each of the first downlink carrier and the second downlink carrier.

In operation S251, the first terminal 210 may receive a first random access response message transmitted using the first downlink carrier. In operation S252, the second terminal 220 may receive a second random access response message transmitted using the second downlink carrier.

According to an embodiment of the present invention, the base station 230 may include information associated with a first wireless resource in the first random access response message and thereby transmit the first random access response message, and may include information associated with a second wireless resource in the second random access response message and thereby transmit the second random access response message.

In operation S261, the first terminal 210 may transmit first uplink data to the base station 230 using the first wireless resource. In operation S262, the second terminal 220 may transmit second uplink data to the base station 230 using the second wireless resource.

When the first wireless resource is the same as the second wireless resource, each of the first terminal 210 and the second terminal 220 may transmit corresponding data to the base station 230 using the same wireless resource. Accordingly, data may collide with each other and the base station 230 may not successfully receive data from either of the first terminal 210 and the second terminal 220.

The first wireless resource may be different from the second wireless resource. In this case, in operation S261, the first terminal 210 may transmit first uplink data to the base station 230 using the first wireless resource. In operation S262, the second terminal 220 may transmit second uplink data to the base station 230 using the second wireless resource. The base station 230 may receive both the first uplink data and the second uplink data using the first wireless resource and the second wireless resource.

When the base station 230 receives both the first uplink data and the second uplink data, the base station 230 may transmit a first random access success message to the first terminal 210 in response to the first uplink data in operation S261, and may transmit a second random access success message to the second terminal 220 in response to the second uplink data in operation S262. The first random access success message may indicate a transmission success message of the first uplink data, and the second random access success message may indicate a transmission success message of the second uplink data.

When the first terminal 210 and the second terminal 220 transmit preambles having the same value using the same wireless resource of the same uplink carrier in operations S251 and S252, the first terminal 210 and the second terminal 220 may complete the random access procedure. Accordingly, a random access success rate of the first terminal 210 and the second terminal 220 may be enhanced. Since a re-access probability decreases, each of the first terminal 210 and the second terminal 220 may quickly perform the random access procedure. A wireless resource required for the random access may be effectively used.

According to an embodiment of the present invention, the first wireless resource and the second wireless resource may indicate different wireless resources of the first uplink carrier. Specifically, the first wireless resource and the second wireless resource may have the same frequency band and have a different time interval.

In operation S261, the first terminal 210 may transmit an identifier of the first terminal 210 to the base station 230 together with the first uplink data. In operation S262, the second terminal 220 may transmit an identifier of the second terminal 220 to the base station 230 together with the second uplink data. The base station 230 may determine whether each corresponding uplink data is transmitted from the first terminal 210 or the second terminal 220 based on the identifier of the first terminal 210 and the identifier of the second terminal 220.

According to an embodiment of the present invention, each of the first random access response message and the second random access response message may include a different temporary terminal identifier (C-RNTI). In operation S251, the first terminal 210 may receive a first temporary terminal identifier included in the first random access response message. In operation S252, the second terminal 220 may receive a second temporary terminal identifier included in the second random access response message. In this case, in operation S261, the first terminal 210 may transmit the first temporary terminal identifier as the identifier of the first terminal 210. In operation S262, the second terminal 220 may transmit the second temporary terminal identifier as the identifier of the second terminal 220.

When the random access procedure is completed, the first terminal 210 may receive downlink data from the base station 230 using the first downlink carrier or the second downlink carrier.

According to an embodiment of the present invention, the base station 230 may select a primary carrier from the first downlink carrier and the second downlink carrier, and may transmit information associated with the selected primary carrier to the first terminal 210.

The first terminal 210 may priorly receive downlink data using the primary carrier.

When a transmission amount of downlink data exceeds a predetermined threshold, the first terminal 210 and the base station 230 may not effectively perform data transmission using only a bandwidth of the primary carrier. In this case, the first terminal 210 and the base station 230 may receive the downlink data by additionally employing a downlink carrier excluding the primary carrier from the first downlink carrier and the second downlink carrier. Since a bandwidth of another downlink carrier is additionally used, the first terminal 210 and the base station 230 may effectively perform data transmission.

Here, it is assumed that the added downlink carrier excluding the primary carrier is referred to as a secondary carrier. When the first terminal 210 additionally uses the secondary carrier and in this instance a data amount decreases, the first terminal 210 may increase a Discontinuous Reception (DRX) time period based on DRX information and thereby decrease a data reception time. Hereinafter, when the DRX time period is short, it corresponds to a short DRX period. When the DR time period is long, it corresponds to a long DRX period.

When the first terminal 210 receives a downlink control channel PDCCH in a long DRX period status, the first terminal 210 may shift from the long DRX period status to a short DRX period status and thereby receive data. In this case, an unnecessary power may be consumed to receive the data.

The first terminal 210 may receive the downlink control channel in the long DRX period status to determine whether to shift from the long DRX period status to the short DRX period status. For example, the first terminal may determine whether a continuous data communication is required by demodulating the downlink control channel or a downlink data channel PDSCH. When the continuous data communication is determined to be required, the first terminal 210 may shift from the long DRX period status to the short DRX period status.

In the following cases, the continuous data communication may not be required:

1) a case where the base station 230 allocates an uplink wireless resource, however, uplink data to be transmitted by the first terminal 210 does not exist, that is, a case where uplink data does not exist in a buffer of the first terminal 210;

2) a case where the base station 230 requests an uplink transmission to maintain an uplink time synchronization;

3) a case where the base station 230 requests the uplink transmission to search for location information of a terminal; and 4) a case where the base station 230 requests a feedback about a downlink channel status.

The first terminal 210 may selectively shift from the long DRX period status to the short DRX period status. Accordingly, every time the first terminal 210 receives the downlink control channel, the first terminal 210 may not receive downlink data. Accordingly, a power consumption may decrease.

Figure 3:
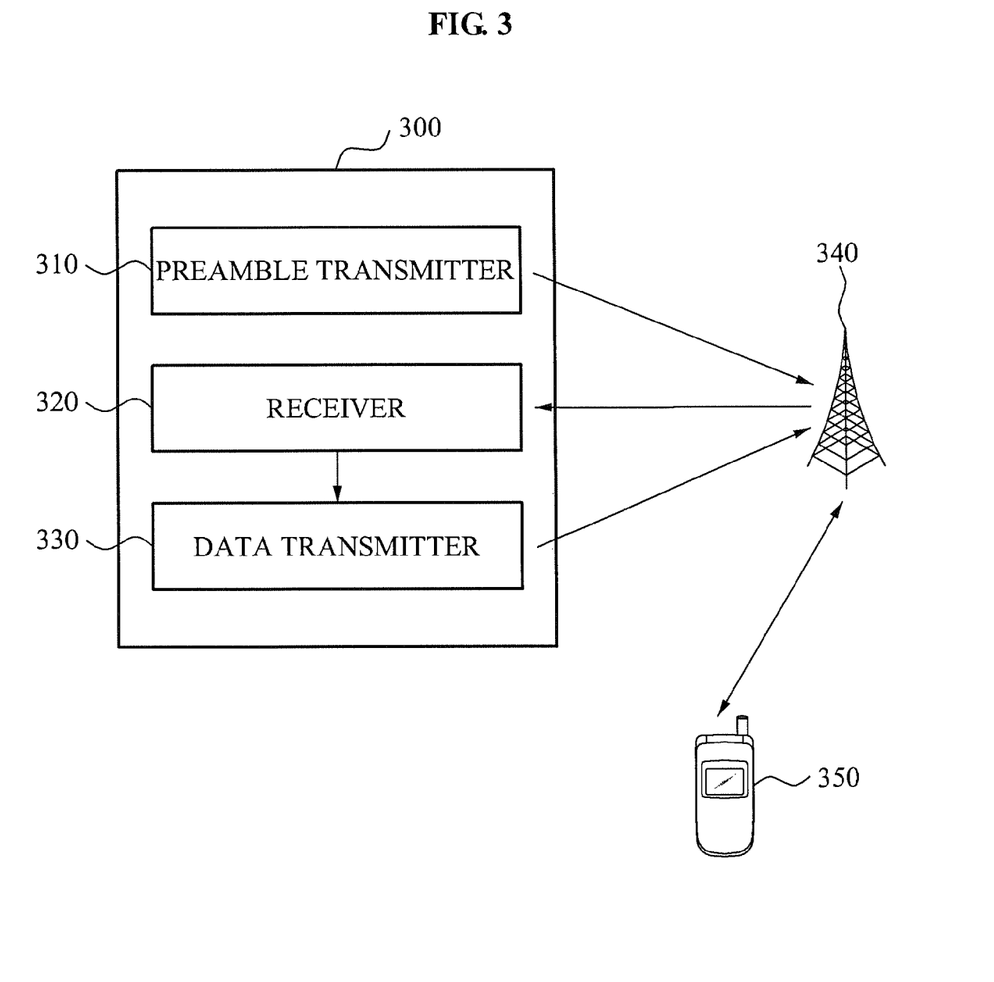
FIG. 3 is a diagram illustrating a structure of a terminal performing a random access when an uplink and a downlink make a one-to-n correspondence according to an embodiment of the present invention.

FIG. 3 is a diagram illustrating a structure of a terminal 300 performing a random access when an uplink and a downlink make a one-to-n correspondence according to an embodiment of the present invention.

The terminal 300 may include a preamble transmitter 310, a receiver 320, and a data transmitter 330.

The receiver 320 may receive base station information using a first downlink carrier, and a second terminal 350 may receive base station information using a second downlink carrier. The base station information may include information associated with the first downlink carrier, the second downlink carrier, and an uplink carrier.

The preamble transmitter 310 may transmit a first preamble to a base station 340 using the uplink carrier. The second terminal 350 may transmit a second preamble to the base station 340 using the uplink carrier. When a value of the first preamble is the same as a value of the second preamble, the base station 340 may not identify each of the first preamble and the second preamble.

The base station 340 may transmit a random access response message associated with a preamble using all of downlink carriers corresponding to the uplink carrier. The base station 340 may transmit a first random access response message using the first downlink carrier. Also, the base station 340 may transmit a second random access response message using the second downlink carrier.

The first random access response message may include information associated with a first wireless resource, and the second random access response message may include information associated with a second wireless resource. The first wireless resource and the second wireless resource may correspond to different wireless resources of the uplink carrier. For example, the first wireless resource and the second wireless resource may indicate different time intervals in the same uplink carrier.

The receiver 320 may receive the first random access message using the first downlink carrier. The second terminal 350 may receive the second random access message using the second downlink carrier.

The first random access message may include a first temporary terminal identifier, and the second random access message may include a second temporary terminal identifier. Each of the first temporary terminal identifier and the second temporary terminal identifier may have a different value.

The data transmitter 330 may transmit first uplink data to the base station 340 using the first wireless resource, and the second terminal 350 may transmit second uplink data to the base station 340 using the second wireless resource.

The data transmitter 330 may transmit an identifier of the terminal 300 to the base station 340 together with the first uplink data. Also, the second terminal 350 may transmit an identifier of the second terminal 350 to the base station 340 together with the second uplink data.

The data transmitter 330 may transmit, to the base station 340 as the identifier of the terminal 300, the first temporary terminal identifier received from the base station 340. Also, the second terminal 350 may transmit, to the base station 340 as the identifier of the second terminal 350, the second temporary terminal identifier received from the base station 340.

In response to the first uplink data, the receiver 320 may receive a first random access success message from the base station 340. The receiver 320 may receive the first random access success message using the first downlink carrier. In response to the second uplink data, the second terminal 350 may receive a second random access success message using the second uplink data. The second terminal 350 may receive the second random access success message using the second downlink carrier.

When the random access procedure is completed, the receiver 320 may receive downlink data from the base station 340. The receiver 320 may receive, from the base station 340, information associated with a primary carrier selected from the first downlink carrier and the second downlink carrier. The receiver 320 may priorly receive downlink data using the primary carrier.

When a transmission amount of downlink data is greater than or equal to a predetermined threshold, the terminal 300 and the base station 340 may not effectively transmit the downlink data using only a bandwidth of the primary carrier. In this case, the receiver 320 may receive the downlink data by additionally employing another downlink carrier excluding the primary carrier from the first downlink carrier and the second downlink carrier.

Figure 4:
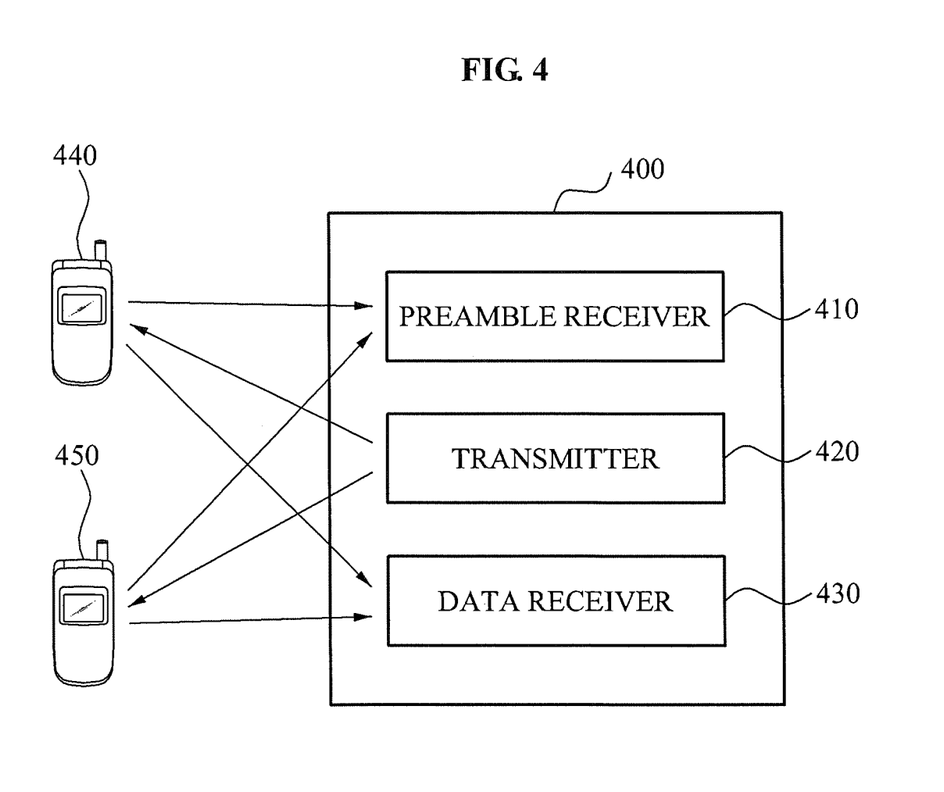
FIG. 4 is a diagram illustrating a structure of a base station performing a random access when an uplink and a downlink make a one-to-n correspondence according to an embodiment of the present invention.

FIG. 4 is a diagram illustrating a structure of a base station 400 performing a random access when an uplink and a downlink make a one-to-n correspondence according to an embodiment of the present invention.

The base station 400 may include a preamble receiver 410, a transmitter 420, and a data receiver 430.

The transmitter 420 may transmit base station information to a first terminal 440 using a first downlink carrier, and transmit base station information to a second terminal 450 using a second downlink carrier. The base station information may include information associated with the first downlink carrier, the second downlink carrier, and the uplink.

The preamble receiver 410 may receive a first preamble from the first terminal 440 using the uplink carrier, and may also receive a second preamble from a second terminal 450 using the uplink carrier. When the first terminal 440 and the second terminal 450 transmit preambles having the same value using the same wireless resource, the preamble receiver 410 may be unaware that the preambles are received from a plurality of terminals, that is, the first terminal 440 and the second terminal 450.

In response to the preamble, the transmitter 420 may transmit a random access response message. For example, the transmitter 420 may transmit a first random access response message to the first terminal 440 using the first downlink carrier, and transmit a second random access response message to the second terminal 450 using a second downlink carrier.

The first terminal 440 may receive the first random access response message using the first downlink carrier, and the second terminal 450 may receive the second random access response message using the second downlink carrier.

The first random access response message may include information associated with a first wireless resource, and the second random access response message may include information associated with a second wireless resource. The first wireless resource and the second wireless resource may correspond to different wireless resources of the uplink carrier. For example, the first wireless resource and the second wireless resource may indicate different wireless resources having the same frequency band and different time intervals.

Also, the first random access response message may include a first temporary terminal identifier and the second random access response message may include a second temporary terminal identifier. Each of the first temporary terminal identifier and the second temporary terminal identifier may have a different value.

The data receiver 430 may receive first uplink data from the first terminal 440 using the first wireless resource, and may receive second uplink data from the second terminal 450 using the second wireless resource. When the first wireless resource is different from the second wireless resource, the data receiver 430 may receive both the first uplink data and the second uplink data.

The data receiver 430 may receive the first uplink data and an identifier of the first terminal 440 together, and may also receive the second uplink data and an identifier of the second terminal 450 together. The data receiver 430 may determine whether each corresponding uplink data is transmitted from the first terminal 440 or the second terminal 450 using the identifier of the first terminal 440 and the identifier of the second terminal 450.

The data receiver 430 may receive the first temporary terminal identifier as the identifier of the first terminal 440, and may also receive the second temporary terminal identifier as the identifier of the second terminal 450.

The data receiver 430 may receive the first uplink data and the second uplink data and determine whether an error occurs in each of the first uplink data and the second uplink data. When the error does not occur in the first uplink data, the transmitter 420 may transmit a first random access success message to the first terminal 440 using the first downlink carrier, in response to the first uplink data. Also, when the error does not occur in the second uplink data, the transmitter 420 may transmit a second random access success message to the second terminal 450 using the second downlink carrier, in response to the second uplink data.

The first random access success message may include the identifier of the first terminal 440, and the second random access success message may include the identifier of the second terminal 450.

When the random access procedure is completed, the transmitter 420 may transmit downlink data to the first terminal 440. The transmitter 420 may select a primary carrier from the first downlink carrier and the second downlink carrier, and may transmit information associated with the primary carrier to the first terminal 440.

The transmitter 420 may priorly transmit downlink data to the first terminal 440 using the primary carrier.

When a transmission amount of downlink data is greater than or equal to a predetermined threshold, the base station 400 and the first terminal 440 may not effectively transmit downlink data. In this case, the transmitter 420 may transmit the downlink data by additionally employing a downlink carrier excluding the primary carrier from the first downlink carrier and the second downlink carrier. Since the downlink data is transmitted using both a bandwidth of the primary carrier and a bandwidth of the other downlink carrier, the transmitter 420 may effectively transmit the downlink data.

Figure 5:
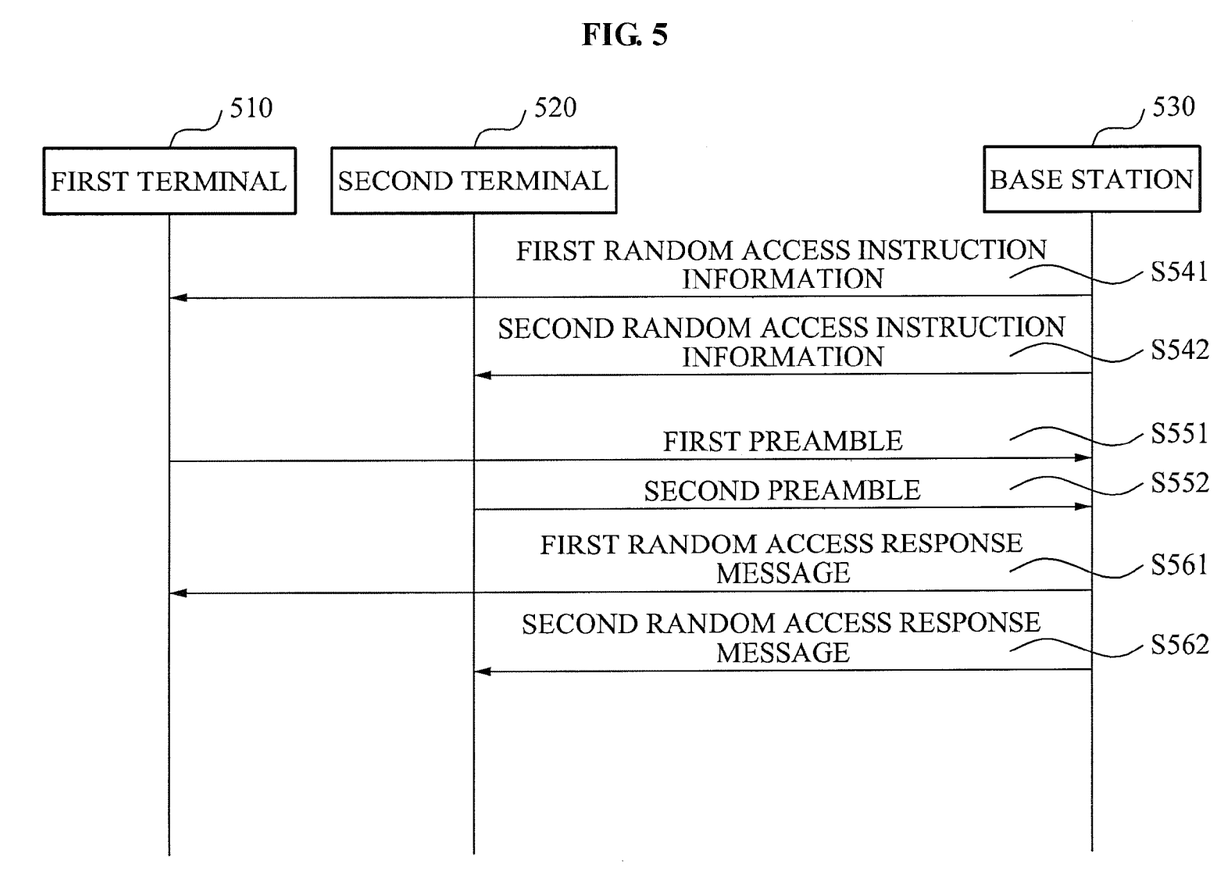
FIG. 5 is a diagram illustrating a random access procedure when an uplink and a downlink make a one-to-one correspondence according to an embodiment of the present invention.

FIG. 5 is a diagram illustrating a random access procedure when an uplink and a downlink make a one-to-one correspondence according to an embodiment of the present invention.

Here, it is assumed that a first terminal 510 receives base station information using a first downlink carrier and a second terminal 520 receives base station information using a second downlink carrier.

When the uplink and the downlink make a one-to-one correspondence, the first terminal 510 may perform the random access procedure using a first uplink carrier corresponding to the first downlink carrier, and the second terminal 520 may perform the random access procedure using a second uplink carrier corresponding to the second downlink carrier.

In operation S541, the first terminal 510 may receive first random access instruction information from a base station 530. In operation S542, the second terminal 520 may receive second random access instruction information from the base station 530. The first random access instruction information may include information associated with a first wireless resource of the first uplink carrier, and the second random access instruction information may include information associated with a second wireless resource of the second uplink carrier. The first random access instruction information may include information associated with an identifier of a preamble to be transmitted by the first terminal 510, and the second random access instruction information may include information associated with an identifier of a preamble to be transmitted by the second terminal 520.

In operation S551, the first terminal 510 may transmit a first preamble to the base station 530 using the first wireless resource. In operation S552, the second terminal 520 may transmit a second preamble to the base station 530 using the second wireless resource.

The base station 530 may determine whether a transmission of the first preamble succeeds. When the transmission of the first preamble succeeds, the base station 530 may transmit a first random access response message to the first terminal 510 in response to the first preamble. When the first terminal 510 successfully receives the first random access response message, the first terminal 510 may transmit the first uplink data to the base station 530.

In operations S552 and S562, the second terminal 520 and the base station 530 may perform a similar operation with respect to the second preamble and the second random access response message.

Figure 6:
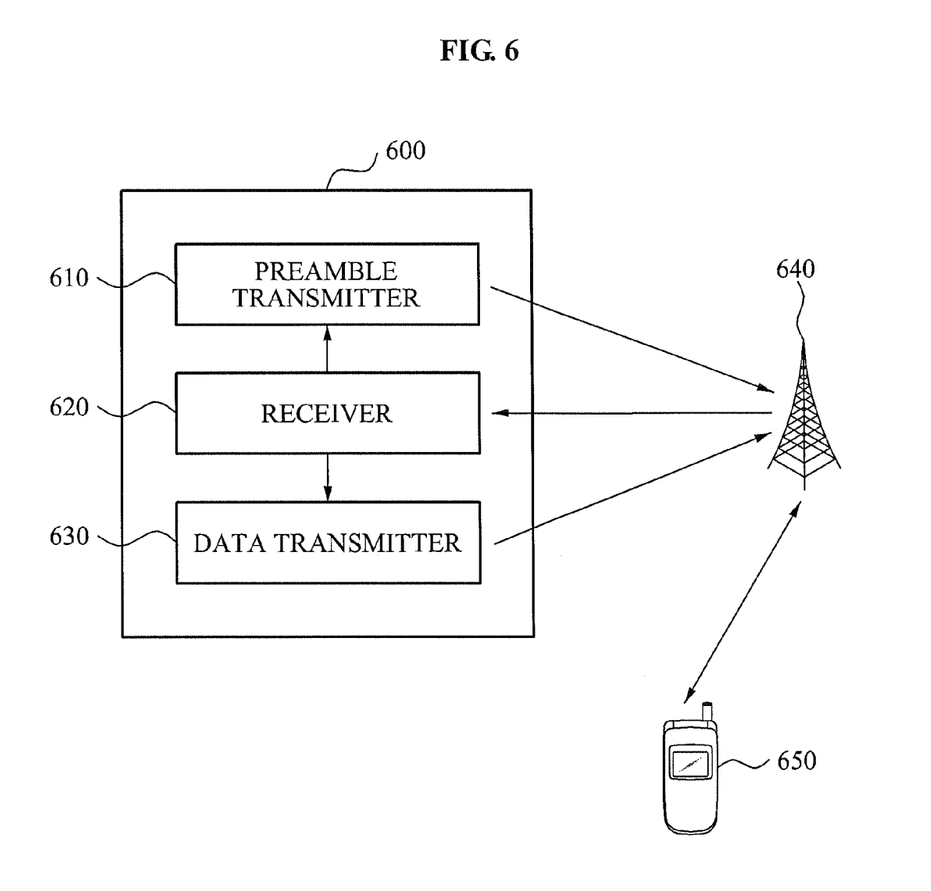
FIG. 6 is a diagram illustrating a structure of a terminal performing a random access when an uplink and a downlink make a one-to-one correspondence according to an embodiment of the present invention.

FIG. 6 is a diagram illustrating a structure of a terminal 600 performing a random access when an uplink and a downlink make a one-to-one correspondence according to an embodiment of the present invention.

The terminal 600 may include a preamble transmitter 610, a receiver 620, and a data transmitter 630.

The receiver 620 may receive, from a base station 640, information associated with a first wireless resource of a first uplink carrier. The receiver 620 may include information associated with the first wireless resource in random access instruction information and thereby receive. The random access instruction information may include information associated with an identifier of a first preamble to be transmitted by the terminal 600.

The first wireless resource may include information associated with a frequency band of the first uplink carrier used when the terminal 600 transmits the first preamble to the base station, or a time interval where the first preamble is transmitted.

The preamble transmitter 610 may transmit the first preamble to the base station 640 using the first wireless resource.

The base station 640 may receive a second preamble from a second terminal 650. The base station 640 may allow a random access of the terminal 600 depending on whether a transmission of the first preamble succeeds, a relationship between the first preamble and the second preamble, and the like.

In response to the first preamble, the receiver 620 may receive a random access response message from the base station 640. The random access response message may include information regarding whether the base station 640 allows the random access of the terminal 600. When the base station 640 allows the random access of the terminal 600, the random access response message may include information associated with a second wireless resource of a second uplink carrier used when the terminal 600 transmits uplink data.

When the base station 640 allows the random access of the terminal 600, the data transmitter 630 may transmit the uplink data to the base station 640 using the second wireless resource.

The second wireless resource may include information associated with a frequency band of the second uplink carrier used when the terminal 600 transmits the uplink data to the base station 640, or a time interval where the uplink data is transmitted.

The first wireless resource may be the same as the second wireless resource. In this case, the base station 640 may omit information associated with the second wireless resource and thereby transmit the random access response message.

According to an embodiment of the present invention, the base station 640 may fail in receiving the first preamble. In this case, the receiver 620 may receive, from the base station 640, a preamble retransmission message with respect to the first preamble. The preamble transmitter 640 may stand by during a predetermined period of time according to the preamble retransmission message. After the predetermined period of time is elapsed, the preamble transmitter 640 may retransmit the first preamble to the base station 640.

According to another embodiment of the present invention, the base station 640 may not allow the random access of the terminal 600. In this case, in response to the first preamble, the receiver 620 may receive a random access failure message from the base station 640. The terminal 600 may stand by during a predetermined period of time according to the random access failure message. After the predetermined period of time is elapsed, the terminal 600 may perform again the random access procedure. In this case, the receiver 620 may receive again a random access instruction message from the base station 640. The preamble transmitter 610 may retransmit a preamble based on the received random access instruction message.

Figure 7:
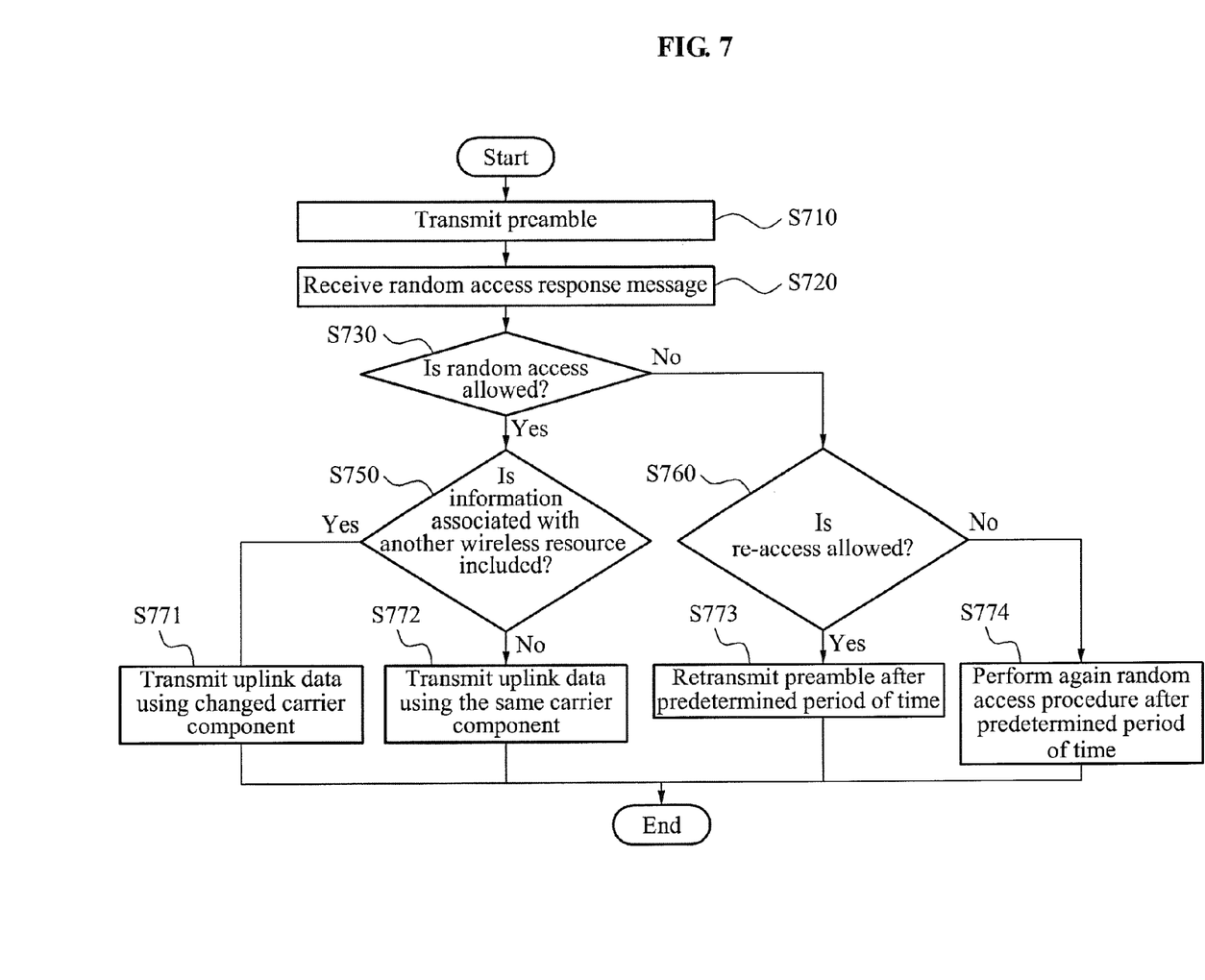
FIG. 7 is a flowchart illustrating an operation of a terminal performing a random access when an uplink and a downlink make a one-to-one correspondence according to an embodiment of the present invention.

FIG. 7 is a flowchart illustrating an operation of a terminal performing a random access when an uplink and a downlink make a one-to-one correspondence according to an embodiment of the present invention.

A terminal may perform a random access procedure to access the base station.

The terminal may randomly select a preamble identifier and may also randomly select a transmission point in time of a preamble. The terminal may receive random access instruction information from the base station. The random access instruction information may include information associated with a wireless resource used when the terminal transmits the preamble.

For example, the terminal may receive random access instruction information using a first downlink carrier. The random access instruction information transmitted using the first downlink carrier may include information associated with a wireless resource of a first uplink carrier corresponding to the first downlink carrier.

Referring to FIG. 7, in operation S710, the terminal may transmit a first preamble to the base station using the wireless resource of the first uplink carrier.

The base station may receive the first preamble. When the first preamble is successfully transmitted, the base station may transmit a random access response message to the terminal in response to the first preamble.

In operation S720, the terminal may receive the random access response message from the base station. The random access response message may include information regarding whether the base station allows the random access of the terminal. When the base station allows the random access of the terminal, the random access response message may include information associated with another wireless resource used to perform the random access.

In operation S730, the terminal may determine whether the base station allows the random access of the terminal.

When the base station allows the random access of the terminal, the terminal may determine whether the random access response message includes information associated with the other wireless resource in addition to information associated with the wireless resource of the first uplink message in operation S750.

When the random access response message includes information associated with the other wireless resource, the terminal may transmit uplink data using the other wireless resource. The other wireless resource may be a wireless resource of the second uplink carrier. When the other wireless resource indicates the wireless resource of the second uplink carrier, the terminal may change a using carrier to the second uplink carrier and transmit the uplink data using the second uplink carrier in operation S771.

Conversely, when the random access response message does not include information associated with the other wireless resource, the terminal may transmit the uplink data to the base station using the first uplink carrier in operation S772.

When the base station does not allow the random access of the terminal in operation S730, the terminal may determine whether the base station allows a re-access of the terminal in operation S760. The random access response message may include information regarding whether the base station allows the re-access of the terminal.

When the base station allows the re-access of the terminal, the terminal may stand by during a predetermined period of time and retransmit a preamble to the base station after the predetermined period of time is elapsed in operation S773.

Conversely, when the base station does not allow the re-access of the terminal, the terminal may stand by during the predetermined period of time and perform again the random access procedure after the predetermined period of time is elapsed in operation S774.

The base station may designate an uplink carrier used when the terminal transmits a preamble. Also, the base station may designate an uplink carrier used when the terminal transmits first uplink data. The base station may designate a wireless resource for a random access depending on whether a wireless resource of the uplink carrier is used. Accordingly, the base station may effectively manage the wireless resource of the uplink carrier.

Figure 8:
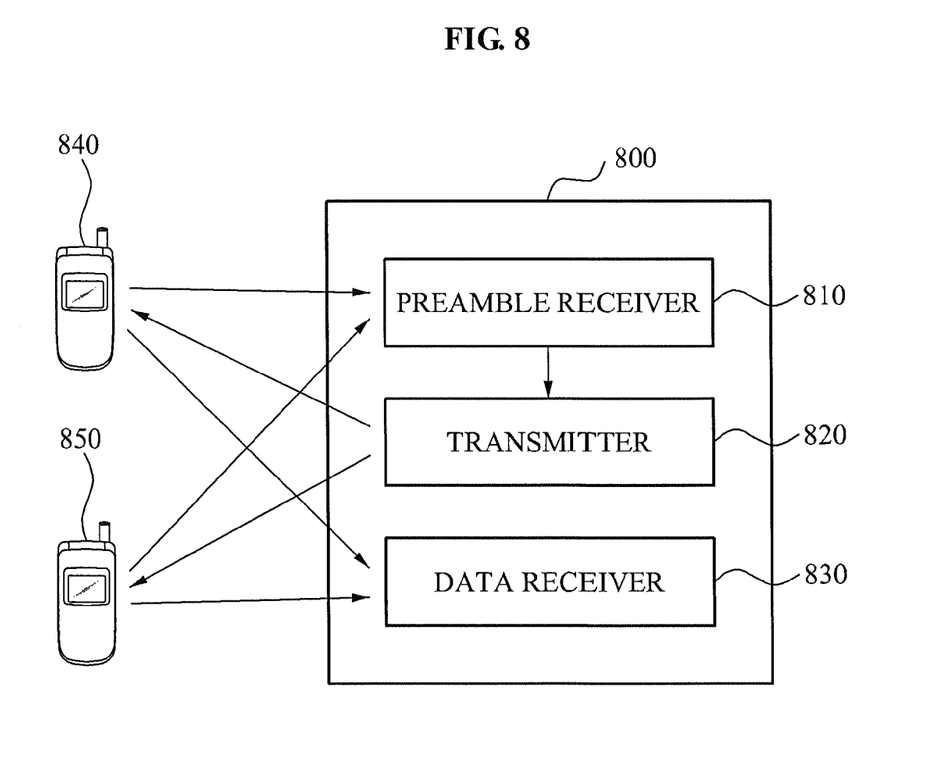
FIG. 8 is a diagram illustrating a structure of a base station performing a random access when an uplink and a downlink make a one-to-one correspondence according to an embodiment of the present invention.

FIG. 8 is a diagram illustrating a structure of a base station 800 performing a random access when an uplink and a downlink make a one-to-one correspondence according to an embodiment of the present invention.

The base station 800 may include a receiver 810, a transmitter 820, and a data receiver 830.

The transmitter 820 may transmit, to a first terminal 840, information associated with a first wireless resource of a first uplink carrier. The first wireless resource may include information associated with a time interval and a frequency band of a first uplink carrier used when the first terminal 840 transmits a preamble to the base station 800.

The preamble receiver 810 may receive a first preamble from the first terminal 840 using the first wireless resource.

The transmitter 820 may select the first preamble to be transmitted by the first terminal 840, and may include an identifier of the selected first preamble in random access instruction information and thereby transmit the random access instruction information to the first terminal 840. The preamble receiver 820 may receive, from the first terminal 840, the first preamble corresponding to the transmitted identifier.

The preamble receiver 810 may receive a second preamble from a second terminal 850. When the first preamble and the second preamble collide with each other, the preamble receiver 810 may fail in receiving the first preamble.

When the preamble receiver 810 does not receive the first preamble, the transmitter 820 may transmit a preamble retransmission message to the first terminal 840. In response to the preamble retransmission message, the first terminal 840 may stand by during a predetermined period of time and retransmit the first preamble after the predetermined period of time is elapsed.

When the preamble receiver 810 receives the first preamble, the transmitter 820 may transmit, to the first terminal 840, information associated with a second wireless resource of a second uplink carrier in response to the first preamble. The transmitter 820 may include information associated with the second wireless resource in the random access response message and thereby transmit. The second wireless resource may include information associated with a time interval and a frequency band of the second uplink carrier used when the first terminal 840 transmits uplink data to the base station 800.

The first wireless resource may be the same as the second wireless resource. In this case, the transmitter 820 may omit information associated with the second wireless resource.

When the first wireless resource is different from the second wireless resource, the first terminal 840 may change a using uplink carrier from the first uplink carrier to the second uplink carrier, and transmit the uplink data using the changed second uplink carrier.

According to an embodiment of the present invention, the preamble receiver 810 may receive the first preamble from the first terminal 840 and may not allow a random access of the first terminal 840. The transmitter 820 may include, in the random access response message, information regarding whether the base station 800 allows the random access of the first terminal 840, and thereby transmit the random access response message.

When the base station 800 does not allow the random access of the first terminal 840, the first terminal 840 may perform again the random access procedure after the predetermined period of time is elapsed.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

EXPLANATION OF REFERENCE NUMERALS 110, 120, 130: downlink carrier
111, 112, 121, 122, 131, 132: base station information
140, 150, 160: uplink carrier
141, 142, 151, 152, 161, 162: random access wireless resource

The invention claimed is:

1. A terminal, comprising:
a preamble transmitter to transmit a first preamble to a base station using an uplink carrier;
a receiver to receive, in response to the first preamble, information defining a first wireless resource of the uplink carrier using a first downlink carrier selected from a plurality of downlink carriers; and
a data transmitter to transmit first uplink data to the base station using the first wireless resource,
wherein a second preamble having the same value as the first preamble, is transmitted from a second terminal to the base station receivers, in response to the second preamble, information defining a second wireless resource of the uplink carrier is transmitted from base station receivers to the second terminal using a second downlink carrier selected from a plurality of downlink carriers, the second downlink carrier is selected from the plurality downlink carriers and is different from the first downlink carrier, a second uplink data is transmitted from the second terminal to the base station receiver using the second wireless resource, and the receiver receives, from the base station, information defining a primary carrier selected from the first downlink carrier and the second downlink carrier, and priorly receives downlink data from the base station using the primary carrier.

2. The terminal of claim 1, wherein:
the data transmitter transmits an identifier of the terminal to the base station.

3. The terminal of claim 2, wherein:
the receiver receives, from the base station, a temporary identifier with respect to the terminal, and
the data transmitter transmits the temporary identifier as the identifier of the terminal.

4. The terminal of claim 1, wherein:
when a data transmission amount of the downlink data is greater than or equal to a predetermined threshold, the receiver receives the downlink data by additionally using a carrier excluding the primary carrier from the first downlink carrier and the second downlink carrier.

5. The terminal of claim 1, wherein the receiver receives a transmission success message of the first uplink data from the base station.

6. A base station, comprising:
a preamble receiver to receive a first preamble from a first terminal using an uplink carrier, and to receive, from a second terminal, a second preamble having the same value as the first preamble using the uplink carrier;
a transmitter to transmit, to the first terminal in response to the first preamble, information defining a first wireless resource of the uplink carrier using the first downlink carrier, and to transmit, to the second terminal in response to the second preamble, information defining a second wireless resource of the uplink carrier using a second downlink carrier, the second downlink carrier being different from the first downlink carrier and the second wireless resource being different from the first wireless resource; and
a data receiver to receive first uplink data from the first terminal using the first wireless resource, and to receive second uplink data from the second terminal using the second wireless resource
wherein, the transmitter transmits, to the first terminal, information defining a primary carrier selected from the first downlink carrier and the second downlink carrier, and priorly transmits downlink data to the first terminal using the primary carrier.

7. The base station of claim 6, wherein:
the receiver receives an identifier of each of the first terminal and the second terminal.

8. The base station of claim 7, wherein:
the transmitter transmits a temporary identifier with respect to each of the first terminal and the second terminal to the first terminal and the second terminal, and
the receiver receives the temporary identifier as the identifier of each of the first terminal and the second terminal.

9. The base station of claim 6, wherein:
when a data transmission amount of the downlink data is greater than or equal to a predetermined threshold, the transmitter transmits the downlink data by additionally using a carrier excluding the primary carrier from the first downlink carrier and the second downlink carrier.

10. The base station of claim 6, wherein:
the receiver determines whether an error occurs in the first uplink data, and
when the error does not occur in the first uplink data, the transmitter transmits a transmission success message of the first uplink data to the first terminal.

11. A terminal, comprising:
a receiver to receive, from a base station, information defining a wireless resource of a first uplink carrier and information defining a primary carrier selected from a first downlink carrier and a second downlink carrier;
a preamble transmitter to transmit a preamble to the base station using the wireless resource of the first uplink carrier; and
a data transmitter,
wherein in response to the preamble, the receiver receives, from the base station, information defining a wireless resource of a second uplink carrier, priorly receives downlink data from the base station using the primary carrier and
the data transmitter transmits uplink data to the base station using the wireless resource of the second uplink data.

12. The terminal of claim 11, wherein:
each wireless resource comprises information defining a frequency band of each corresponding uplink carrier and a time interval where the preamble or the uplink data is transmitted.

13. The terminal of claim 11, wherein:
in response to the preamble, the receiver receives a preamble retransmission message from the base station, and
according to the preamble retransmission message, the preamble transmitter retransmits the preamble to the base station after a predetermined period of time is elapsed from a transmission point in time of the preamble.

14. The terminal of claim 11, wherein:
in response to the preamble, the receiver receives a random access failure message from the base station, and
according to the random access failure message, the receiver receives again information defining the wireless resource after a predetermined period of time is elapsed from a transmission point in time of the preamble.

15. A base station, comprising:
a transmitter to transmit, to a terminal, information defining a wireless resource of a first uplink carrier and information defining a primary carrier selected from a first downlink carrier and a second downlink carrier;
a preamble receiver to receive a preamble from the terminal using the wireless resource of the first uplink carrier; and
a data receiver,
wherein in response to the preamble, the transmitter transmits, to the terminal, information defining a wireless resource of a second uplink carrier priorly transmits downlink data to the terminal using the primary carrier, and
the data receiver receives uplink data from the base station using the wireless resource of the second uplink carrier.

16. The base station of claim 15, wherein:
when the preamble receiver does not receive the preamble, the transmitter transmits a preamble retransmission message to the terminal.

17. The base station of claim 15, wherein:
each wireless resource comprises information defining a frequency band of each corresponding uplink carrier and a time interval where the preamble or the uplink data is transmitted.

* * * * *